No. 671,593.  
C. R. HARPER.  
REGISTER.  
(Application filed June 9, 1900.)  
Patented Apr. 9, 1901.
(No Model.)
Fig. 1.
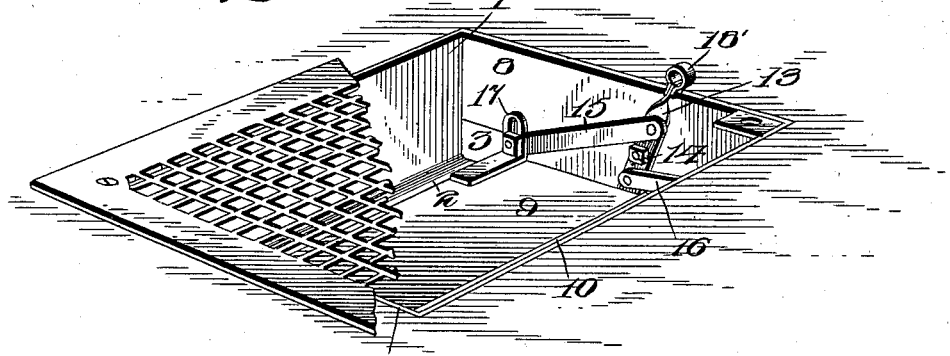
Fig. 2.
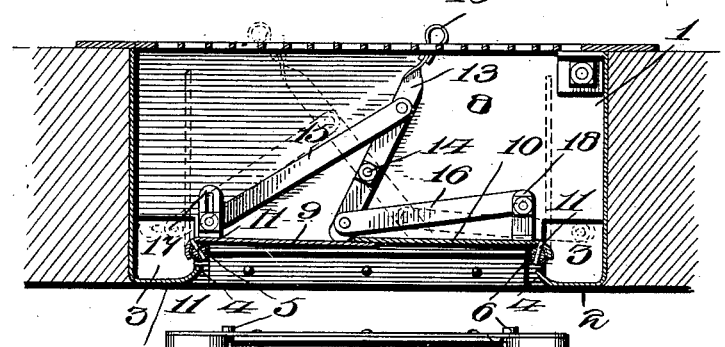
Fig. 3.
Charles R. Harper
Inventor
Witnesses

UNITED STATES PATENT OFFICE.

CHARLES R. HARPER, OF MARSHALLTOWN, IOWA.

REGISTER.

SPECIFICATION forming part of Letters Patent No. 671,593, dated April 9, 1901.

Application filed June 9, 1900. Serial No. 19,768. (No model.)

*To all whom it may concern:*

Be it known that I, CHARLES R. HARPER, a citizen of the United States, residing at Marshalltown, in the county of Marshall and State of Iowa, have invented a new and useful Register, of which the following is a specification.

My invention relates to improvements in registers; and the object is to provide means for preventing dust, which accumulates upon the doors, leaves, or valves, from being projected into the apartment by the inflowing current of air when the register is opened.

To this end the invention consists in providing dust-troughs within the register-casing and so related to the leaves that the dust accumulated upon said leaves will be deposited into the troughs when the register is opened.

The invention consists, further, in certain peculiarities of construction and arrangement, all of which will be hereinafter more fully described, illustrated in the accompanying drawings, and defined in the appended claims.

In said drawings, Figure 1 is a perspective view of a floor-register with a portion of its cover-plate broken away to disclose the interior parts. Fig. 2 is a transverse sectional view through the subject-matter of Fig. 1, and Fig. 3 is a bottom plan view thereof.

Referring to numerals of reference employed to designate corresponding parts in the several views, 1 indicates a register-casing of rectangular or other form, preferably constructed of cast metal and having its opposite side edges disposed inwardly to form dust-troughs 2, extending from end to end of the casing, which latter is provided in one end wall at the ends of the troughs with openings 3, through which the dust may be deposited by the tilting of the register when it is removed from time to time for the purpose of cleaning. Immediately above the upturned inner edges 4 of the trough 2 are disposed a pair of rock-shafts 5 and 6, journaled in the end walls 7 and 8 of the casing 1 and supporting the outer edges of the movable leaves or valves 9 and 10, the free edges of which overlap, when the leaves are closed, for the purpose of closing the register to the passage of hot or cold air currents intended for heating or ventilating purposes, as the case may be. The outer or hinged edges of these leaves are bent around the rock-shafts 5 and 6 a short distance and are secured by rivets or pins 11, which insure the elevation or depression of the leaves to a vertical position, as shown in dotted lines in Fig. 2, or to the horizontal position, as shown in full lines in said figure. The leaves are retained in the closed position by stops 12, projecting from the end walls of the casing and closing the spaces between the leaves and the end walls, and said leaves are actuated by a valve-lever 13, pivotally mounted on the wall 8 of the casing, as indicated at 14, and operatively connected with the leaves by means of links 15 and 16, pivoted to the lever 13, above and below the pivot of the latter, and connected at their outer ends to short arms 17 and 18, extending upwardly from the contiguous ends of the leaves 9 and 10, adjacent to but not directly at their hinged edges. Thus when the handle 18' of the lever 13, projecting above the cover-plate of the register, is moved to one position or the other the leaves or valves 9 and 10 are elevated or depressed to open or close the register, as the case may be, and by reason of the provision of the dust-troughs 2 any dust or other debris which may have accumulated upon the closed leaves will upon the opening of the register and the elevation of the leaves be deposited within the troughs instead of being thrown back into the air-flues to be carried into the apartment with the current of hot or cold air passing through the register. This desirable characteristic of the device is brought about by two distinct variations from the usual construction of devices of this character. The first and primary variation is of course the provision of the dust-troughs, and the other and almost equally important variation is the hinging of the leaves or valves at one edge instead of at the center, this peculiarity permitting the troughs to be located practically in the horizontal plane of the closed leaves and to receive the accumulation from the entire area of said leaves as the latter are thrown into positions above the troughs by the opening of the register.

From the foregoing it will appear that I have produced a simple and ingenious improvement in registers by means of which the accumulations of dust will be prevented from being passed into the apartment by inflowing currents of air; but while the present embodiment of my invention appears at this time to be preferable I do not desire to limit myself to the precise construction and arrangement illustrated and described, as, on the contrary, I reserve the right to effect such changes, modifications, and variations as may be comprehended within the scope of the protection prayed, as it is obvious that many such variations may be effected without departing from the spirit of the invention—as, for instance, the employment of a greater number of leaves or valves and a corresponding increase in the number of troughs. Obviously, also, the valves or leaves may be cast with trunnions instead of being formed of sheet metal and riveted to the shafts, as shown.

What I claim is—

1. In a register, the combination with a casing provided with dust-troughs, of valves arranged to deposit dust accumulated thereon into the troughs when moved to their open positions.

2. In a register, the combination with a casing and a movable valve, of a dust-receptacle located directly below the valve in one position only of the latter whereby dust accumulated upon the valve will be deposited in the receptacle when the valve is moved to a position thereabove.

3. In a register, the combination with a casing, and a valve hinged at one end, of a dust-trough located at the hinged edge of the valve to receive the accumulated dust when the valve is opened.

4. In a register, the combination with a casing and a valve hinged at one edge, of a dust-trough extending from end to end of the casing and located adjacent to the hinged edge of the valve and in a lower plane to receive the accumulation of dust from the valve upon movement of the latter.

5. In a register, the combination with a casing having the lower edge of one of its walls inturned to form a dust-trough, of a valve hinged at one edge immediately above the edge of the trough to receive the accumulation of dust from the valve upon its movement.

6. In a register, the combination with a casing provided with dust-troughs extending along the lower edge of certain of its walls, valves hinged at their edges immediately above the contiguous edges of the dust-troughs, and means for operating said valves to positions above the troughs to deposit accumulated debris therein.

7. A register-casing having the lower edges of its opposed side walls inturned to form dust-troughs and provided with openings in its wall to facilitate the removal of accumulation from the troughs.

8. In a register, the combination with a casing provided with dust-troughs, of hinged valves arranged to deposit dust accumulated thereon into the troughs through the movement of the valves.

9. In a register, the combination with a casing provided with dust-troughs and having openings located at the ends of the troughs, of hinged valves arranged to deposit dust accumulated thereon into the troughs.

In testimony that I claim the foregoing as my own I have hereto affixed my signature in the presence of two witnesses.

CHARLES R. HARPER.

Witnesses:
J. E. SMITH,
A. G. VAN ORMAN.